United States Patent Office 2,991,825
Patented July 11, 1961

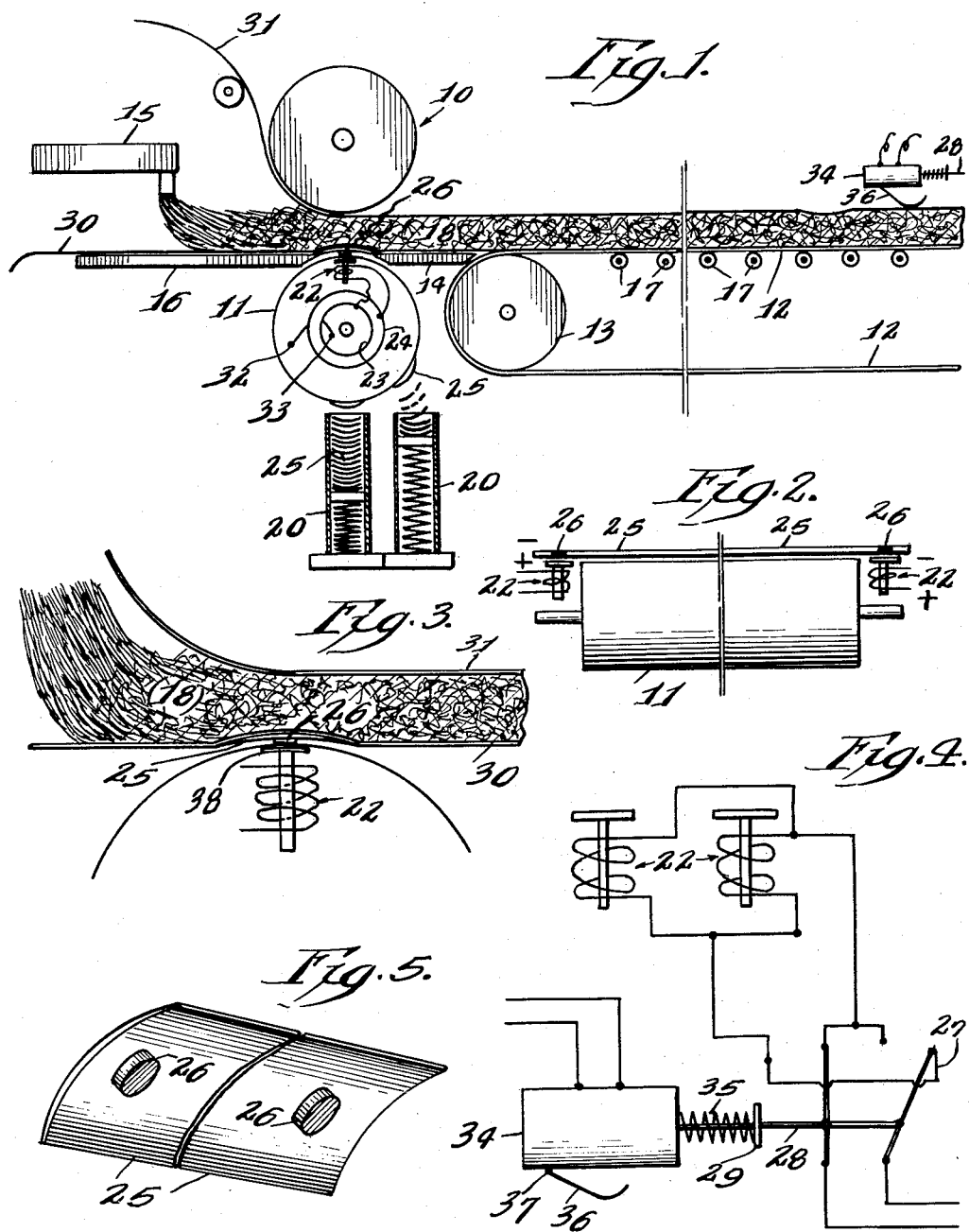

2,991,825
GYPSUM WALLBOARD AND PROCESS OF MANUFACTURE
Edward A. Hampson, Evanston, Ill., assignor to The Celotex Corporation, Chicago, Ill., a corporation of Delaware
Filed Sept. 5, 1957, Ser. No. 682,217
7 Claims. (Cl. 154—1.25)

The inventions hereof are with respect to an apparatus for the manufacture of gypsum wallboard, in particular such wallboard which is provided at its opposite ends with recesses in the face thereof. Such face recesses, when two boards are erected end to end, particularly as in a ceiling or the like, provide a recess in the face of the board at the joint in which there may be suitably bedded a joint covering tape which is then covered with plastic and smoothed off so as to provide a smooth and unbroken surface across the joint.

It is to be understood, of course, that the inventions hereof may be practiced in connection with the production of gypsum wallboard which is additionally provided with similar side edge recesses in its face so that such wallboard when installed may be taped around its entire periphery so that the resulting so-called "dry wall" construction presents no visible joints between adjacent wallboards.

The basic structure for the production of the gypsum wallboard hereof is the usual construction comprising a pair of master rolls between which are fed the face papers comprising the faces of the wallboard and between which paper facings there is supplied a gypsum slurry which spaces the paper facings and provides the core of the composite wallboard product. It is, of course, to be understood that one of the paper facings in the usual procedure is scored along its edges so that the opposite edges may be turned upwardly and the extreme edge retroverted so that in effect this paper facing which is the bottom paper sheet fed to the device is in effect a pan-like member which retains the slurry deposited thereon which, in conjunction with the other paper facing, when its edges are adhered to the retroverted edges of the bottom sheet, constitutes a closed edge continuous board-form sheet as such issues from the master rolls. Commonly, this sheet, when it issues from the master rolls, is received on a setting conveyor which, of course, is driven at the same speed as the peripheral speed of the master rolls and on which the gypsum core of the composite sheet sets while the sheet is carried on such setting conveyer. After the core of the composite sheet has set, the continuously produced sheet is cut to suitable length and then passes into a drier where the excess moisture is driven off to constitute the finished product.

A particular object of the inventions hereof is to provide a supplemental construction in conjunction with the usual gypsum board producing apparatus, whereby in the composite sheet, as it is formed, there is molded across a face thereof a recess which, when the continuously produced sheet is cut medially of such recess, provides individual sheets which have at their opposite end edges the desired face recesses.

A further object of the invention hereof is to provide such supplemental structure of the production apparatus which will mold the recess in the board as it is being formed between the master rolls, and to provide a control mechanism therefor whereby a molding strip, at properly timed intervals, suitably deforms one of the paper facings and molds the core to form a recess in a face thereof to result in the end edge recess of the finished product as above referred to.

Other and further objects of the inventions hereof will be apparent upon reading the accompanying specification in conjunction with the appended drawings.

In the drawings,

FIGURE 1 is a diagrammatic elevation of a gypsum board producing apparatus;

FIGURE 2 is a schematic elevation of a master roll;

FIGURE 3 is an enlarged view of the detail of molding a recess;

FIGURE 4 is a diagrammatic illustration of the control of the auxiliary recess-forming apparatus; and FIGURE 5 is a perspective of a molding strip.

It is to be understood that in the accompanying drawings the structure, particularly that normal to a production gypsum board producing machine, is schematic, there being no showing whatsoever of immaterial detail. All gypsum wallboard is produced on machines which are basically as shown in the accompanying drawings, the general procedure of producing gypsum wallboard being the same throughout the industry and therefore well understood by those skilled in the art. It is deemed that any detail disclosure with respect to the general apparatus for producing gypsum wallboard would be superfluous and would only tend to ambiguity with respect to the disclosure hereof.

In the drawings the basic gypsum wallboard producing apparatus is illustrated as comprising a top master roll 10 and a bottom master roll 11 which are mounted with their axes substantially vertical, one over the other, and are spaced in accordance with the thickness of the board to be produced.

Paper facing sheets 30 and 31 are fed between the master rolls and a mixer 15 deposits gypsum slurry on the bottom of such sheets. As such composite passes between the master rolls, the gypsum slurry is spread out between the paper facings and the thickness, of course, is determined in accordance with the spacing of the master rolls. The composite sheet, that is the paper facings with the gypsum slurry core, identified as 18, as it issues from the master rolls usually passes across a transfer plate 14 onto a setting belt 12 trained over a roll 13. The upper surface of this setting belt is usually supported by a number of supporting rolls 17 so as to maintain the upper surface thereof as a plane surface.

The inventions hereof comprehend the provision of supplemental or auxiliary devices applied to the basic gypsum board machine, as above briefly described. Briefly, these auxiliary devices comprise a molding member 25 which is at suitable intervals mounted to the peripheral surface of a master roll to revolve therewith, whereby such molding member 25 will mold a recess in the face of the composite board as it is being formed between master rolls 10 and 11. Provision is made, after molding member 25 has functioned to mold a recess in a face of the board, for the release of the molding member 25 from the master rolls, whereby upon continued rotation of the master rolls, no further recess is formed except under controlled conditions as now described.

Provision is made for periodically mounting the molding member to the periphery of a master roll at suitably timed intervals, whereby a transverse recess will be formed in a face of the composite board as it is being formed and whereby, such occurring at properly timed intervals, the such transverse recesses may be formed at regular intervals so that when the continuously produced sheet is cut medially of such molded recess there are provided individual gypsum wallboards of uniform length, each of which has face recesses provided at its opposite end edges.

Mold member 25 is preferably provided adjacent its ends with small permanent magnets 26 which magnets should be similarly oriented, that is, with their poles in like arrangement with respect to the surface of mold member 25, and it will be assumed that their negative poles are the poles adjacent the surface of mold member 25 and their respective positive poles are the poles of permanent magnets 26 which are those more remote from the surface of mold member 25.

For attaching or mounting mold member 25 to a master roll, for example master roll 11, electro-magnets are mounted adjacent the ends of the mold roll, mounted in line, that is, centered on a line on the surface of the master roll, which line is parallel to the axis of the master roll. Such magnets are identified by numeral 22, and it will, of course, be understood that they are provided with suitable windings for energizing the magnets and that suitable armature members, such as 38, are provided. The windings on the magnets 22 at the respective ends should be so wound that both magnets are of the same polarity when energized, and for the purposes of this description it will be assumed that for the conditions shown the armature is at the negative pole and the positive pole is the other end of the magnet remote from the armature. Subject to the conditions just above referred to, it is evident that when the electro-magnets 22 in the revolution of master roll 11 contact or substantially contact the permanent magnets 26 of mold strip 25, the permanent magnets will be attracted to the electro-magnets and consequently mold strip 25 will be thus mounted to the surface of the master roll to revolve therewith. Since if the mold strip 25 so attached to the master roll remains so attached it will form a recess in the board being formed on every revolution of the master roll, it is of course obvious that provision must be made for releasing mold strip 25 from the master roll until the expiration of the interval required for the proper positioning of the next recess, that is, until the board being formed has progressed for a distance equal to the length of the finished board being produced.

For activating and deactivating the electro-magnets 22 there is provided a timing device which may take various forms and may be variously positioned with respect to the board being formed but which, for the purposes hereof, is exemplified as a device 34 which may be termed a "time delay actuator," the function of which is to suitably and in timed manner actuate a polarity-reversing switch to reverse the polarity of the current being supplied to electro-magnets 22. Since time delay actuator devices are available in various forms, no detail of the device 34 has been included herein. It is deemed sufficient to say that the device 34 is provided with a sensing member 36, the function of which is to sense a formed face recess in the board being produced to, upon so sensing such recess, initiate actuation of the time delay device 34. Device 34 is provided with an actuator 28 which is connected to a reversing switch, such as illustrated, and identified by numeral 27. If desired, the time delay device 34 may be positively actuated in only one direction and actuator rod 28 may be provided with a stop, such as 29 and spring 35 which may serve for return actuation of reversing switch 27.

In accordance with the foregoing, the operation is that as sensing member 36 senses a transverse recess in the face of the board being formed, it will energize the time delay actuator 34 to retract actuator rod 28 which, being connected to reversing switch 27, will change the position from that as illustrated to reverse the current being supplied to electro-magnets 22. The sensing member 36 is so positioned with respect to board being formed that it will cause actuation of reversing switch 27 at the proper interval so as to energize electro-magnets 22 to pick up and magnetically attach a mold strip 25 to the surface of master roll 11, with a time interval provided so that the mold strip 25 will reach the vertical diameter of master roll 11 at the proper time for positioning a succeeding transverse recess in the board being formed, which succeeding recess is properly spaced from the preceding recess which had been formed. The time delay actuator, by a suitable time lapse relay therein, will retain the actuator rod in reacted position until master roll 11 has rotated to the extent where the mold member 25 is approximately 30° below the horizontal, whereupon this relay device releases and allows the actuator rod 28 to return the reversing switch 27 to the position as shown in the drawing. This operation reverses the current supply to electro-magnets 22, consequently reversing the polarity thereof, whereupon mold strip 25 is released and is actually rejected or repelled from the surface of master roll 11.

In connection with the foregoing, it may seem somewhat strange that the transverse recesses molded into the board as it is formed are molded in the bottom face thereof whereas, in FIGURE 1, it appears that there is a molded recess in the top face of the board. This is not an error but such results due to the character of the formed board. As earlier referred to, the board as formed, is formed as a continuous board, encased in the facings which actually constitute an elongated rectangular tube, which is in fact continuous until the formed board is cut to individual lengths. As the transverse recess is formed in the bottom face of the board between master rolls 10 and 11, the core encased in the paper facings is a very soft gypsum slurry, which is not self-sustaining. During the board formation stage some water from the gypsum slurry, at least to a degree, saturates and softens the paper facing sheets in which the gypsum slurry is encased so that the entire formed assemblage is what might be termed "plastic." As soon as a formed transverse recess has moved forward sufficiently, that is no longer supported by mold strip 25, the entire assemblage will sink or settle until the lower face of the formed sheet is supported on transfer plate 14, or it will have so settled at least by the time the line of original formation shall have reached the forward end of the setting conveyor 12. This portion of the board will actually settle down until it is supported by transfer plate 14 or conveyer 12 with the lower face of the board, again a plane surface, showing no evidence of having had a transverse recess formed in the under side thereof. Due to the fact that the board at a line of formation of a transverse recess has been thinned by the amount of the recess formed, it follows that when the formed recess sinks or settles so that the lower surface of the board again becomes plane, that the transverse recess originally formed in the under face of the board is transferred to the upper face of the board to appear as shown to the right in FIGURE 1. Of course, as the board proceeds on the setting conveyer, the gypsum core will set and rididify and the desired transverse recess accordingly becomes permanent in the upper surface of the board as formed.

Reference has been made to maintaining mold strip 25 suitably supported adjacent the surface of master roll 11. While it would be possible to utilize but one mold strip 25, which could be repeatedly picked up from a support and in turn rejected thereto, it is deemed advisable to utilize a number of such mold strips 25, one form of so handling these mold strips being illustrated in the drawings. There is shown a device 20 in the nature of a hot plate cabinet which has been adapted to support a stack of mold strips 25. These hot plate cabinets are suitable enclosures provided with a support member on which a stack of dishes may be placed and which is provided under the support member with springs so designed so as to maintain the topmost dish of the supported stack substantially level with the top of the cabinet. Utilizing such a device herein will provide a stack of mold strips 25, the topmost one of which will be maintained substantially in contact with master roll 11 and in a position diametrically below the roll axis. Alternatively, any other step-by-step feeder apparatus may be used; for example, one in which the step-by-step movement is achieved by a pall and rack feeder, or by nut and screw, or suitably controlled hydraulic operation. With this arrangement a mold strip 25 will be at all times in close proximity or in substantial contact with the periphery of master roll 11, so that when electromagnets 22 are suitably energized the topmost mold strip 25 will be picked up from the stack and mounted to the periphery of the master roll.

After the master roll with an attached mold strip 25 has suitably revolved until the mold strip is about 30° below the horizontal, then the reversal of the electrical supply to the electro-magnets 22, reversing the polarity thereof, will reject the mold strip which then will drop into a second cabinet 20 positioned alongside the previously referred to cabinet 20, and the mold strips 25 will be consecutively discharged to such cabinet 20. It will, of course, be understood that periodically the cabinets 20 must be reversed as the supply of mold strips 25 is exhausted from the one and filled into the other.

The windings of electro-magnets 22 may be connected to conductive rings, such as 23 and 24, mounted on the ends of master roll 11, and current may be supplied thereto as by brushes 32 and 33.

Very briefly summarizing the device described: Gypsum slurry is encased in paper facings as a continuous rectangular tube encasement. As this continuous board is being formed, a transverse recess is molded into the lower face by a transverse mold strip carried by one of the master rolls, which determines the thickness of the board being made and otherwise acts to form the desired continuous board. This mold strip is, by a suitable device, periodically and in timed relation, attached to the master roll, and after the molding step is rejected therefrom, whereupon the master roll continues to revolve without such attached mold strip until, in proper timed relation, a transverse mold strip is reattached thereto for molding the next properly spaced recess in the board being formed. This operation continues indefinitely to provide in the continuously formed board transverse recesses at uniformly spaced intervals. The recess in the under side of the board being formed while the board is in a very plastic condition will sink or settle by gravity to transfer the formed recess to the opposite surface of the board. A sensing device is provided to sense the recesses in the upper surface of the continuously formed board and such causes actuation of a time delay actuator to, at the proper time, cause a mold strip 25 to be mounted to the periphery of a master roll, and after the proper time delay interval, to cause rejection of the mold strip 25 therefrom, as has been referred to.

It will be obvious, of course, to those skilled in the art, that the continuously formed board, as referred to, with the transverse recesses provided as described, will, as the board progresses on setting conveyer 12, set so that the core becomes relatively rigid, whereupon, on severing the board transversely and medially of the formed recesses, there will result individual gypsum wallboards which are provided at each end with a surface recess. These cut boards then, of course, feed into a drier where excess moisture is evaporated therefrom to result in the finished commercial gypsum wallboard.

The inventions hereof having been disclosed and described in detail, I claim:

1. In an apparatus for the manufacture of gypsum wallboard and comprising spaced master rolls, means feeding paper facing sheets thereto, a mixer for supplying gypsum slurry to between the facing sheets and a setting belt receiving formed wallboard from the master rolls, the improvement comprising an electromagnet mounted to a master roll, a molding lath supported adjacent the master roll to which the electromagnet is mounted, and means serially energizing and deactivating the electromagnet whereby at predetermined intervals the molding lath is magnetically coupled to the master roll and rotates therewith until released by deactivation of the electromagnet.

2. The apparatus of claim 1 wherein the means energizing and deactivating the electromagnet is a device operatively mounted relative the setting belt and activated by formed wallboard carried thereon, the device including sensing means activated from the formed wallboard and in turn activating switching means reversing polarity of the electrical supply energizing the electromagnet.

3. In an apparatus as described for the manufacture of gypsum wallboard and including a master roll, the improvement comprising a molding strip, means supporting the molding strip in close proximity to the periphery of the master roll and an electromagnet mounted to the master roll magnetically mounting the molding strip to the periphery of the master roll.

4. In an apparatus for the manufacture of gypsum wallboard and which consists essentially of a pair of vertically spaced master rolls and a setting belt, means to one side of the master rolls supplying paper facing sheets therebetween and a gypsum slurry mixer depositing gypsum slurry between the facing sheets and setting conveyer means on the other side of the master rolls and receiving the formed gypsum wallboard therefrom, the improvement for forming a transverse surface recess extending across the width of gypsum board formed thereon and comprising an electromagnet mounted to a master roll adjacent each of the ends thereof, a molding strip, a support supporting the molding strip transversely with respect to the master roll and closely adjacent the periphery thereof, and means connecting a source of electric energy to the windings of the electromagnets.

5. The apparatus of claim 4 wherein permanent magnets are mounted to the molding strip adjacent the respective ends thereof.

6. The apparatus of claim 4 wherein the means connecting a source of electric energy to the windings of the electromagnets and by reverse action disconnecting the electric energy supply incorporates a time delay device restraining reverse action of said means disconnecting the electric energy supply to the electromagnets for a predetermined time interval.

7. The apparatus of claim 4 wherein the means connecting a source of electric energy to the windings of the electromagnets includes a polarity reversing device connected thereto and actuated thereby and connecting the electric energy supply to the electromagnets, in its one position of a given polarity and in its other position of reverse polarity.

References Cited in the file of this patent

UNITED STATES PATENTS

| | | |
|---|---|---|
| 2,044,234 | Walper | June 16, 1936 |
| 2,168,803 | Page | Aug. 8, 1939 |
| 2,246,987 | Roos | June 24, 1941 |
| 2,537,509 | Camp | Jan. 9, 1951 |
| 2,775,787 | Krag | Jan. 1, 1957 |
| 2,877,823 | Antwerpen et al. | Mar. 17, 1959 |